United States Patent [19]

Ramsay et al.

[11] Patent Number: 4,894,827
[45] Date of Patent: Jan. 16, 1990

[54] REDUNDANCY AND BUFFERING CIRCUITS

[75] Inventors: John Ramsay; Thomas Quellette, both of Herndon; Richard N. Deglin, Reston, all of Va.

[73] Assignee: International Telesystems Corporation, Herndon, Va.

[21] Appl. No.: 163,243

[22] Filed: Mar. 2, 1988

[51] Int. Cl.⁴ .............................................. G06F 11/00
[52] U.S. Cl. .................................. 371/8.2; 371/34
[58] Field of Search ........................ 371/8, 34, 68, 70

[56] References Cited

U.S. PATENT DOCUMENTS

| | | | |
|---|---|---|---|
| 3,453,592 | 7/1969 | Ishii et al. | 371/34 |
| 4,011,542 | 3/1977 | Baichtal et al. | 371/8 |
| 4,070,648 | 1/1978 | Merganthaler et al. | 371/70 |
| 4,369,516 | 1/1983 | Byrns | 371/70 |
| 4,633,473 | 12/1986 | Ratchford et al. | 371/68 |

*Primary Examiner*—Charles E. Atkinson
*Attorney, Agent, or Firm*—James Creighton Wray

[57] ABSTRACT

This invention provides an improved means for communicating between a central communications or computer processor and a plurality of peripheral devices via a serial interface such as a pulse coded modulation (PCM) bus. The processor sends data via one of two redundant communications channels, such as a PCM bus, to the peripheral devices, each of which is equipped with a data receiving means such as a shift register. These data receiving means check a specific character position of the input data for a pattern which is unlikely to occur at random, such as hexadecimal '7E'. (X '7E' has a bit pattern of 0111 1110.) Whenever the specified pattern is detected, a return pattern is generated in a specified character position of the data stream which is periodically sent back to the processor. As long as these return characters are received, the processor continues to send data via the first communications channel, and the receiving peripheral devices continue to read their data from that channel. When the return pattern is not received, however, the redundance circuit recognizes this fact and switches to the other communications channel. The receiving means on the peripheral devices detect that the special pattern is now being received in the specified character position of the second communications data stream and switch to read data from the second channel. Thus the error-checking features of more complicated and expensive systems are provided without the need for sophisticated processors on the peripheral devices.

12 Claims, 4 Drawing Sheets

FIG. 2
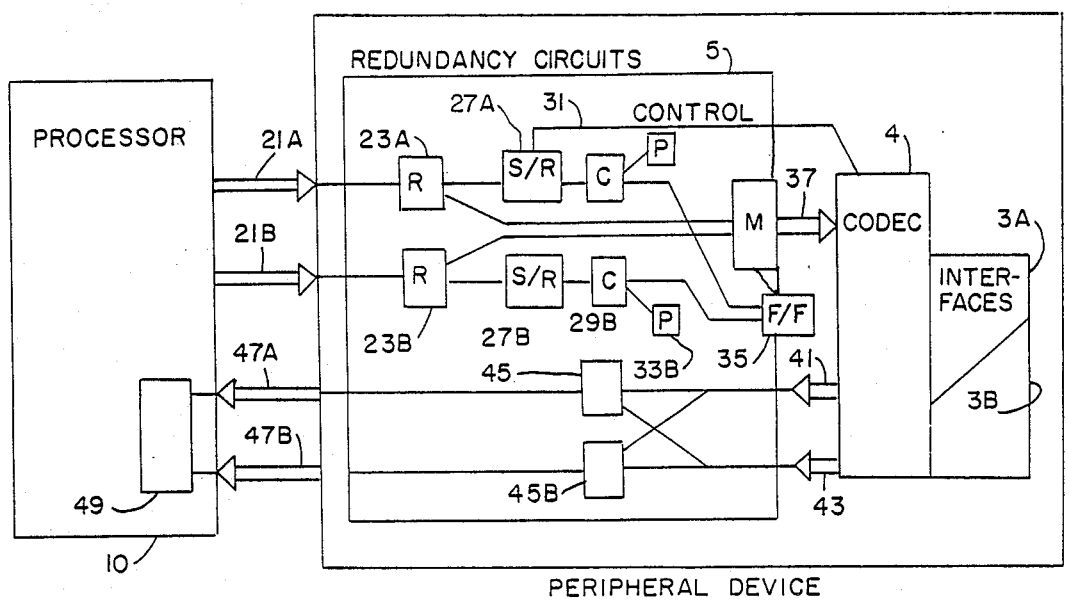
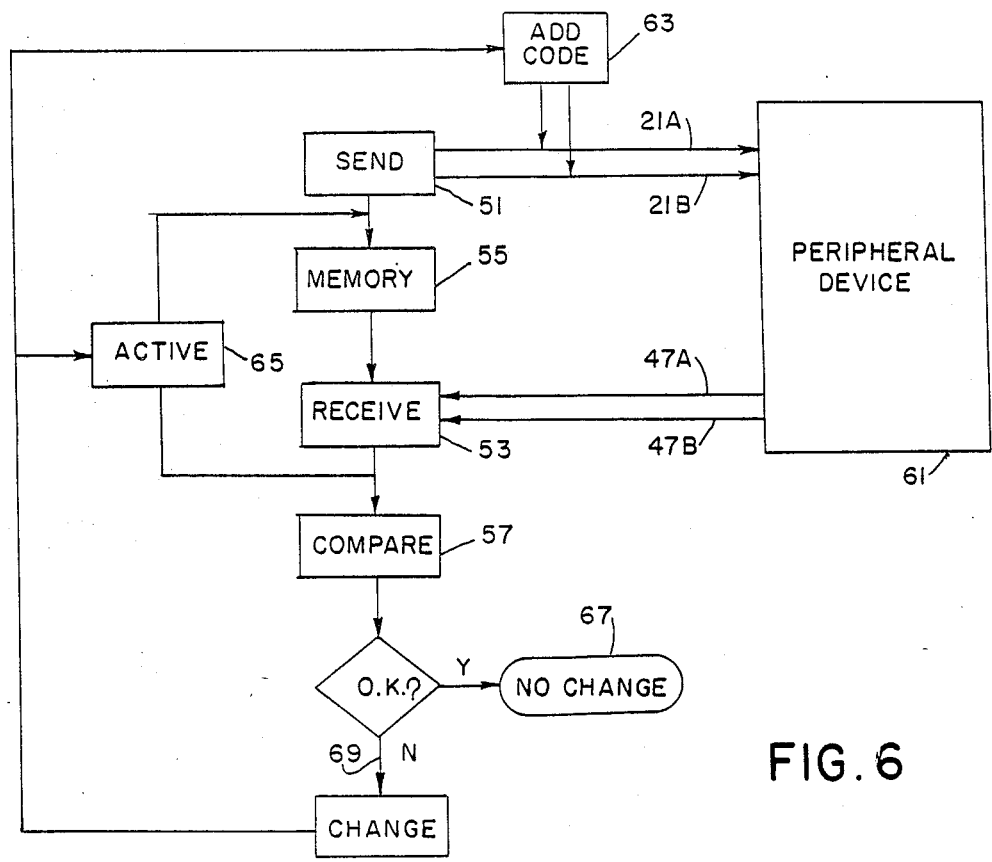
FIG. 6

REDUNDANCY AND BUFFERING CIRCUITS

BACKGROUND OF THE INVENTION

The present invention relates to systems to connect one or more central computer or communications processor to a plurality of peripheral devices, as part of a communications or data processing network. Systems currently in use utilize multiple redundant connections in order to ensure continuing communications between the central processor and the peripheral devices even if failures or errors occur in the communications. Some such systems also include error-checking means or methods, such as processing means or systems included as part of the peripheral devices, these processing means or systems are equipped to check signals arriving from the central processor and to transmit back to the central processor information indicating whether the information has been received correctly. An need exists to improve the connection and error-checking means, in order to provide reliable communications between the central processor and the peripheral devices at substantially lesser cost, and in substantially more physically compact form, than systems currently in use.

SUMMARY OF THE INVENTION

This invention provides an improved means for communicating between a central communications or computer processor and a plurality of peripheral devices via a serial interface such as a pulse coded modulation (PCM) bus. The processor sends data via one of two redundant communications channels, such as a PCM bus, to the peripheral devices, each of which is equipped with a data receiving means such as a shift register. These data receiving means check a specified character position of the input data for a pattern which is unlikely to occur at random, such as hexadecimal '7E'. (X'7E' has a bit pattern of 0111 1110.) Whenever the specified pattern is detected, a return pattern is generated in a specified character position of the data stream which is periodically sent back to the processor. As long as these return characters are received, the processor continues to send data via the first communications channel, and the receiving peripheral devices continue to read their data from that channel.

When the return pattern is not received, however, the redundancy circuit recognizes this fact and switches to the other communications channel. The receiving means on the peripheral devices detect that the special pattern is now being received in the specified character position of the second communications data stream and switch to read data from the second channel. Thus the error-checking features of more complicated and expensive systems are provided without the need for sophisticated processors on the peripheral devices.

The above and following specification describes the operation of one preferred redundancy and buffering system.

BRIEF DESCRIPTION OF THE DRAWINGS

FIG. 2 is a schematic representation of the system showing redundancy and buffering circuit components between the processor and a peripheral device.

FIGS. 4, 5 and 6 are flow diagrams showing software selection of the desired buses.

Figure 3:
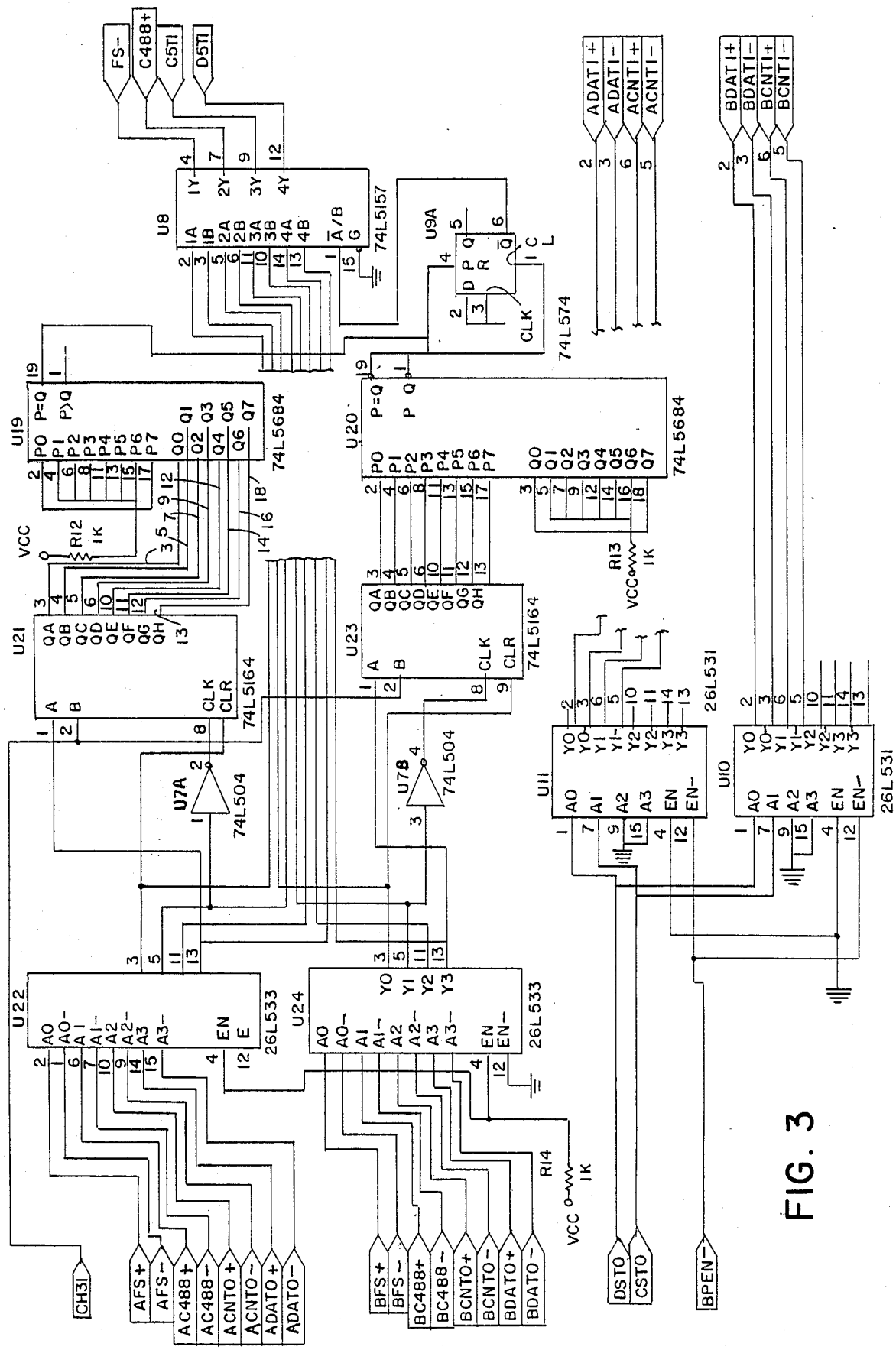
FIG. 3 is a schematic representation of the redundancy and balanced drivers and receivers.

The following guidelines are adhered to as closely as possible in the FIG. 3 schematic:

All inputs are on the left and all outputs are on the right.

Power and ground are not normally included on the devices unless specification is deemed necessary.

All inputs (eg. ADR0—), and all outputs (eg. DAT0), as well as groups of components, are always labelled with the low order bit at the top and the high order bit at the bottom.

A negative sign following a signal (eg. CA—) means that the signal is true low.

DETAILED DESCRIPTION OF THE DRAWINGS

Figure 1:
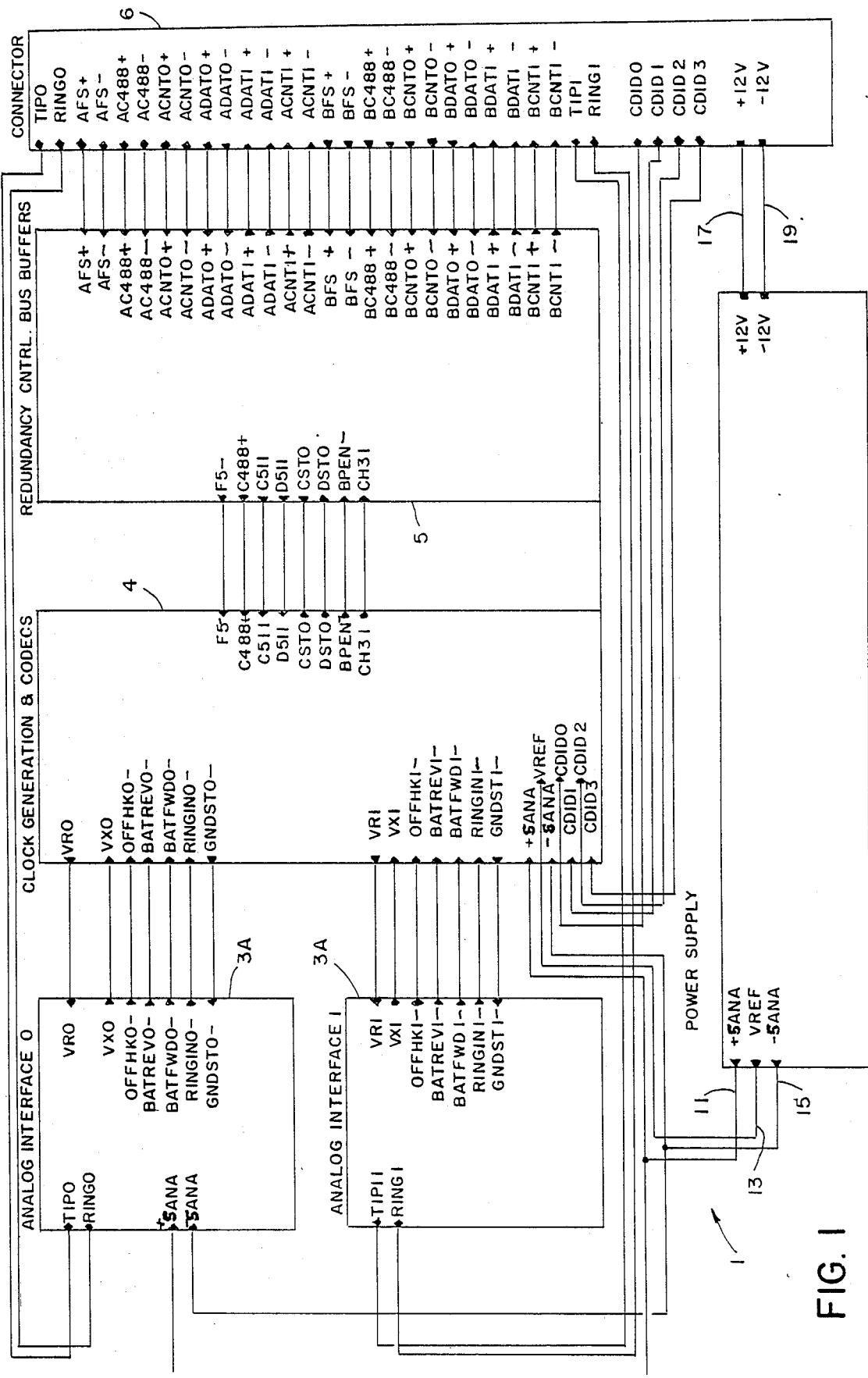
FIG. 1 is a schematic block diagram of one preferred embodiment of the system, which shows that this preferred embodiment of the system is a peripheral device composed of four main sections: the power supply section; the telephone analog trunk interfaces; the codecs and timing generation; and the drivers and receivers which are connected to the connector for further connection to the processor.

One preferred embodiment of the system 1 is shown in FIG. 1. This invention utilizes a power supply 2 and interfaces 3, 3A to isolate the Central Office from the local equipment of a trunk circuit. This isolation prevents interference from the local equipment from entering the telephone network, thus meeting F.C.C. requirements for interfacing to telephone networks.

The power supply 2 supplies specific stabilized voltages to the system. FIG. 1 represents these circuits as specific cards connected to each other and to a system connector 6, such as a backplane, which is provided with tip and ring connectors to a Central Office and connections to a processor.

The two backplane buses 21A, 21B in FIG. 3 are received on two different balanced receivers 23A and 23B such as 26LS33's. This is done so that if one buffer fails, it will not impact the other bus. The two receivers are driven to a multiplexer 25 such as a 74LS157. This multiplexer can select either one bus or the other. The selection is done under software control. As described earlier, channel 31 is decoded on every trunk card in the file by a decoder connected to the select generation circuitry shift registers 27A and 27B in FIG. 3. The redundancy scheme for the trunk file uses two complete ST-Buses. That is to say clock, frame pulse, control in/out and data in/out are all duplicated. These duplicate signals are sent down the cable to the trunk file. A specific channel, Channel 31 in one preferred embodiment, of each PCM out stream is programmed as a control channel. The enable signal previously decoded loads channel 31 of each PCM out stream into its respective shift register 27A, 27B such as a 74LS164. If the microprocessor wishes to select a stream as the 'on-line' stream an X'7E' must be programmed into channel 31. This, of course, assumes that this control stream is working, but this is a necessary criterion for this stream to be used. The X'7E' will compare correctly with the strapped value on the 74LS684 comparators 29A, 29B, and the flip-flop 35 in the middle right of FIG. 2 will select the correct multiplexer inputs. The unused stream should have its control channel programmed so that channel 31 has anything but an X'7E'. If a control stream fails, the likelihood of an X'7E' being emulated in the data stream is very low. Normally the link will go to one rail or the other.

Two drivers 45A, 45B such as 26LS31's are used at the bottom of FIG. 2 for transmission of information to the switch file in the processor. This is done so that should one buffer fail, the other is completely separate and can still carry information. PCM and control information are sent to the switch file on both links all the time. The processor at the far end merely switches the DX network chip to use the link which appears to be correct.

Referring to FIG. 2, the processor 10 supplies PCM signals through ST-buses 21A and 21B to receivers 23A and 23B in the redundancy circuit 5. The receivers provide PCM signals to multiplexer 25 and to shift registers 27A and 27B. A strobe, enable signal from CODEC 4 is supplied on line 31 to both shift registers. The shift registers load signals from the respective receivers and supply signals to respective comparators 29A and 29B, which are programmed 33A and 33B. One comparator provides a control signal to bistable flip-flop 35 when the contents of the related shift registers correspond with the program in the comparators.

When the contents of a particular shift register are not identical to the program of its comparator, the comparator provides no signal to the flip-flop 35. If the flip-flop had previously set the modulator to transmit signals from the receiver associated with the shift register having the correct code, the flip-flop does not change the multiplexer but continues transmitting those signals from the associated receiver. The multiplexer continues to transmit the signals from the first receiver until the comparator associated with that receiver indicates incorrect information in the shift register, whereupon the flip-flop changes state and causes the multiplexer to transmit signals from the second receiver.

In one example, the processor is providing indentical information streams of pulse code modulated signals on buses 21A and 21B to receivers 23A and 23B, with a single exception. On channel 31 of the data stream of bus 21A, a code X'7E' is added. Flip-flop 35 has controlled multiplexer 25 to transmit on bus 37 the signals from receiver 23A.

For each pulse code train transmitted to a receiver from the processor, identical PCM signals of opposite sign are transmitted on parallel lines in each bus. When the receiver reads the incoming signals as inverted identical signals with opposite sign, it puts out a single identical signal on an output.

For example, two identical inputs of opposite sign, AFS+ and AFS−, are received on receiver 23A at inputs AO and AO− respectively. When the signals are identical and opposite, a single signal AFS− output at YO. Any slight voltage level variation in either incoming signal is thus reduced. An improved output signal is then provided from the receiver to the multiplexer.

The receivers supply a clock signal and a clear signal to the associated shift registers. The CODEC supplies a return strobe enable signal to the shift registers on line 31. Part of the information signal from the receiver 23A includes the code in the signal which is supplied from receiver 23A to the shift register 27A as well as to the multiplexer 25. The stored signal in shift register 27A is transferred to comparator 29A. The signal is identical with the strapped value on comparator 29A. As long as that is the case, a correct result signal is supplied from the comparator 29A to the flip-flop 35. As long as the data signal received by the receiver 23A continues, the code portion of the signal passed to shift register 27A is correct, and as long as the signal from the shift register correctly compares with the strapped signal on comparator 29A, the consistent signal on flip-flop 35 maintains the flip-flop in its current state. The flip-flop holds the multiplexer in the state in which information signals from receiver 23A pass through the multiplexer 25 through bus 37 to the CODEC 4. An incorrect signal or no code signal received from the receiver 23A causes an incorrect or no signal in the shift register 27A. The output signal from comparator 29A discontinues. A code in receiver 23B is sent to shift register 27B and to comparator 29B, which signals the flip-flop. The flip-flop changes to its second bistable state, causing the multiplexer 25 to discontinue transmitting signals from receiver 23A and to change condition, so that it transmits signals from receiver 23B.

Receiver 23B is identical to receiver 23A and transmits output signals to the multiplexer 25 in parallel with the output signals from receiver 23A. Receiver 23B may also transmit the code to shift register 27B which is enabled by a signal returning from the CODEC 4 on line 31. The output receiver 27B is compared with the strapped value of comparator 29B. As long as the values are the same, an output signal is supplied to flip-flop 35.

As long as the signal is applied from comparator 29A to flip-flop 35, the multiplexer continues to transmit on bus 37 the signals received from bus 21B in receiver 23B. When the comparator indicates an incorrect match, indicating that the signal from receiver 23B is incorrect, the signal from comparator 29B discontinues, and the flip-flop 35 changes state. The flip-flop changes the multiplexer 25 to transmit on line 37 the incoming signals from receiver 23A.

The system continues operating and transmitting through the multiplexer 25 the signals from a particular receiver until the shift register associated with that receiver receives an incorrect signal from the receiver. Whereupon the comparators and the flip-flop cause the multiplexer to change condition and transmit signals from the other receiver.

Return signals from the interface through CODEC 4 are transmitted on lines 41 and 43. The incoming signals are concurrently placed on drivers 45A and 45B which concurrently transfer all the signals on buses 47A and 47B to the processor 10. A selection circuit 49 within the processor selects from which bus 47A or 47B the signals are taken according to the apparent correctness of the signals returning on the currently selected data bus. The drivers 45 convert the signals from a single signal to dual inverted identical signals of opposite sign on parallel output lines. Thus each driver 45A has two inputs 41 and 43, and four outputs. Two of the outputs relate to the input from line 41, and two of the outputs of each driver relate to the input from line 43. Thus buses 47A and 47B contain four output signals. The complete signals from both of the buses are received in processor 10.

Figure 4:
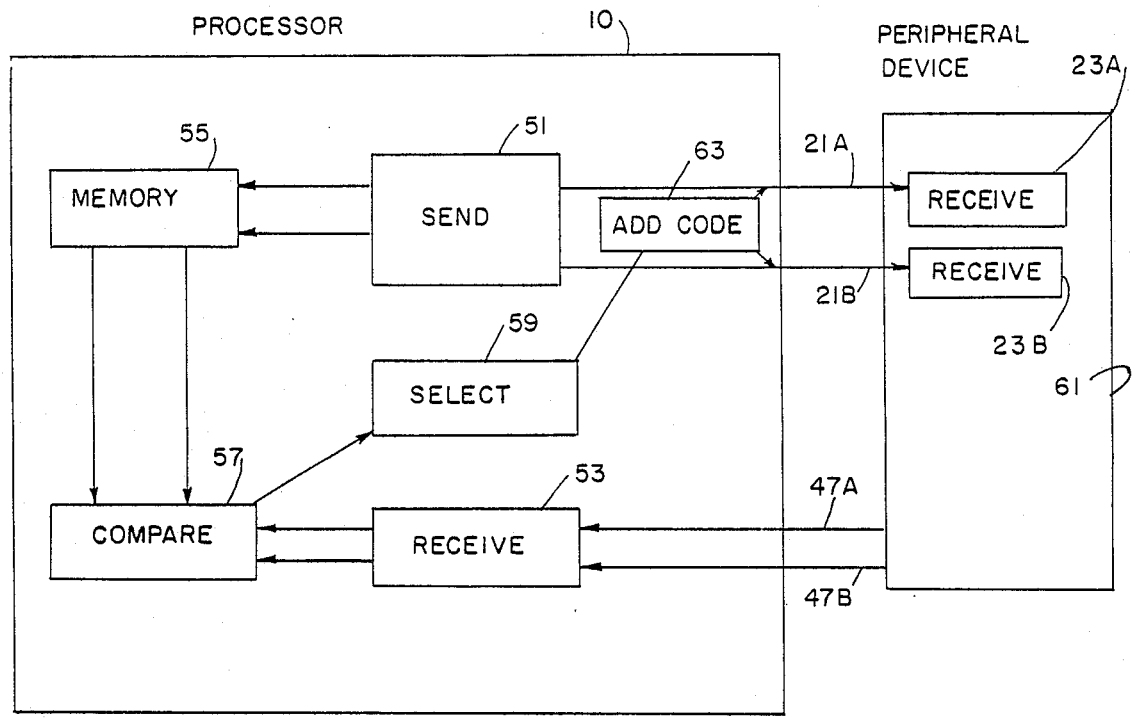

Referring to FIG. 4, processor 10 sends 51 identical data or parallel outputs 21A and 21B. Processor 10 receives 53 identical data on parallel inputs 47A and 47B. As the processor sends the data, it stores 55 at least part of the data. As the processor receives the data, it compares 57 at least part of the received data with the stored data. The processor selects 59 which output bus 21A or 21B will have its data used in the peripheral device 61. The selecting causes a code to be added 63 in a particular channel, for example channel 31 of a PCM data stream, in the seleced bus 21A or 21B.

As the processor 10 receives the data on 47A and 47B, it compares at least a part of the data from one of the input buses with stored data that the processor has sent. If the data is incomplete or unsatisfactory as determined by the comparison, the selection of the ouput bus changes, and the code is added to the newly selected output bus. Data from that bus continues in use until data received by the processor compares unfavorably with data sent by the processor, whereupon the selector adds the code line to the other output bus.

Figure 5:
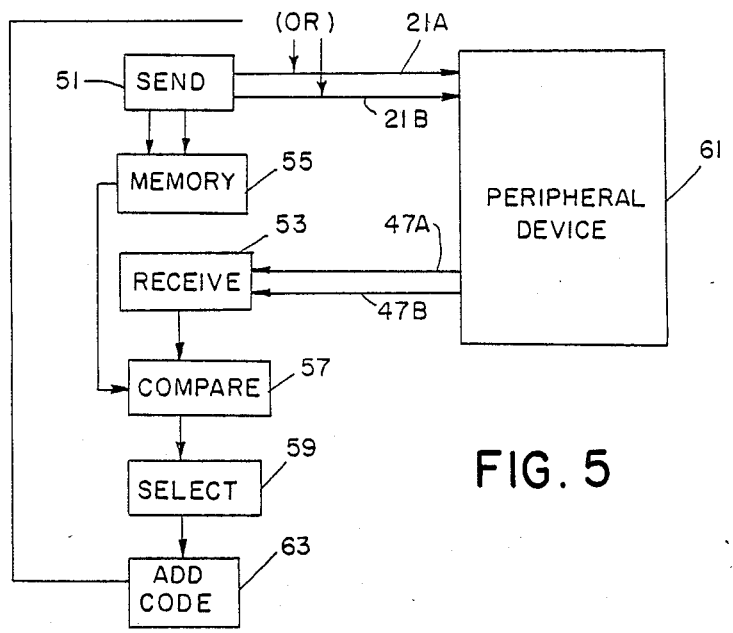

The steps of the software process in the processor 10 are shown in FIGS. 5 and 6. Identical data is sent 51 concurrently on the parallel outputs. At least part of the data is stored 55. Data is received 53 on the parallel inputs. At least part of the received data is compared 57 with the stored data 55. As a result of the comparison, the selector 59 adds 63 the code to the selected output.

FIG. 6 shows the same steps for selecting the signal which is being used in the peripheral device 61. The storing 51 is activated 65 to store at least a portion of the data from the actively used output. The comparing 57 is activated 65 to compare stored data with data received only on the input bus which corresponds to the utilized output. If the comparison matches 67, no change is made. If a discrepancy is noted 69, a change is made by adding 63 the throughput code to the opposite output bus. The change also changes the activating 65 to store and compare data only from the bus sending the data which is currently in use by the peripheral device 61.

While the invention has been described with reference to specific embodiments, modifications and variations may be constructed without departing from the scope of the following claims.

We claim:

1. Redundancy and buffering circuit apparatus for connecting between peripheral devices and processors comprising first and second identical processor output buses, first and second identical receivers individually connected to the first and second output buses, a multiplexer having inputs and outputs, the multiplexer inputs being connected to outputs of the first and second receivers, and peripheral device inputs connected to the multiplexer outputs, first and second shift registers connected respectively to the first and second receivers, first and second comparators having strapped signals and connected respectively to the first and second shift registers, a flip-flop connected to the first and second comparators and to the multiplexer for receiving signals from the comparators and for controlling state of the multiplexer and for providing signals from the multiplexer outputs according to the received signals from the comparators.

2. The apparatus of claim 1 further comprising plural peripheral output connectors, first and second output buffers connected to the plural output connectors so that each output buffer is connected to all of the peripheral output connectors, and processor input buses connected to the first and second output buffers for providing identical parallel outputs to the processor.

3. The apparatus of claim 2 wherein the output buffers include signal inverting means for inverting signals from the peripheral output connectors, and wherein each output buffer comprises plural inputs and first and second output means connected to each input, the first and second output means comprising means for providing identical signals of opposite polarity, each output buffer thereby providing twice the number of outputs as inputs.

4. The apparatus of claim 3 wherein the processor includes means for supplying identical data streams to the processor output buses, means for receiving data from the processor input buses and means for comparing at least part of the data from at least one of the input buses with at least part of the data supplied by the processor to the processor output buses, and output selecting means for selecting one output bus for providing data to use in the peripheral device.

5. Redundancy and buffering circuit apparatus for connecting between peripheral devices and processors comprising first and second identical processor output buses, first and second identical receivers individually connected to the first and second output buses, a multiplexer having inputs and outputs, the multiplexer inputs being connected to outputs of the first and second receivers, and peripheral device inputs connected to the multiplexer outputs, first and second shift registers connected respectively to the first and second receivers, first and second comparators having strapped signals and connected respectively to the first and second shift registers, a flip-flop connected to the first and second comparators and to the multiplexer for receiving signals from the comparators and for controlling the state of the multiplexer and for providing signals from the multiplexer outputs according to the received signals from the comparators, and code adding means for adding a code signal to a data stream in a selected output bus, wherein the first and second shift registers further comprise means for receiving the code signal from the first and second receivers respectively and wherein the first and second comparators comprise means for comparing strapped signals in the comparators with the code signal from the shift registers.

6. Redundancy and buffering circuit means for interconnecting a processor with a peripheral device comprising input buffering means for receiving from a processor plural parallel duplicate identical signals having opposite signs and for providing plural output signals related to the duplicate identical signals having opposite signs, and multiplexing means connected to outputs of the input buffering means, the multiplexing means including paired input means for receiving substantially identical pairs of signals from the input buffering means in the multiplexing means, the multiplexing means comprising means for changing a state to connect one input from each paired input means to one output, bistable means connected to the multiplexing means for controlling and changing state of the multiplexing means, and control means for controlling the bistable means according to a signal from the input buffering means.

7. The apparatus of claim 6 wherein the control means comprises register means connected to the input buffering means for holding signals from the input buffering means and comparator means connected to the register means for comparing strapped signals in the comparator means with signals from the register means and control signalling means connected between the comparator means and the bistable means for controlling condition of the bistable means according to the comparing.

8. The apparatus of claim 7 wherein the input buffering means comprise first and second parallel receivers, wherein the register means comprise first and second shift registers individually connected to the receivers, and enabling means connected to the shift registers for enabling the shift registers to receive pulse codes from the receivers, and wherein the comparator means comprise first and second strapped comparators individually connected to the first and second shift registers for receiving information from the shift registers and comparing that information with strapped information in the comparators, and wherein the bistable means comprises a flip-flop having first and second inputs, and wherein the control signalling means comprises outputs of the comparators, whereby a signal from one of the comparators causes the flip-flop to control a state of the multiplexing means so that the multiplexing means passes signals from multiplexing means inputs connected to outputs of one of the receivers which is connected to the shift register to which the last mentioned one of the comparators is connected.

9. The apparatus of claim 8 wherein the buffering and redundancy circuit means further comprises output buffering and driving means having inputs and outputs, and peripheral device output connectors connected to the output buffering and driving means inputs, processor input bus means connected to the outputs of the output buffering and driving means, the output buffering and driving means further comprising inverting means for inverting signals from the inputs, the outputs having parallel paired identical signal outputs for each input, the inverting and duplicating means providing on the paired outputs identical signals of opposite signs for each input signal.

10. The apparatus of claim 9 wherein the output buffering and driving means comprise first and second output buffers and drivers and wherein the input means comprise means for connecting each peripheral device output to an input of each output driver and buffer, the inputs comprising an input on each buffer for each peripheral device output, and the buffer and driver outputs comprising twice as many outputs as inputs.

11. The apparatus of claim 10 wherein the processor includes means for supplying identical data streams to each of the receivers, means for receiving data from the buffer and driver output buses, and means for comparing at least part of the data received by the processor with at least part of the data supplied by the processor, and output selecting means, connected to the means for comparing, for selecting, according to the comparing, one data stream for providing data for use in the peripheral device.

12. The apparatus of claim 11 wherein the processor further comprises code adding means for adding a code signal to the selected data stream and wherein the first and second shift registers further comprise means for receiving the code signal from one of the first and second receivers which receives the selected data stream and wherein the first and second comparators comprise means for comparing strapped signals in the comparators with the code signal from the shift registers for providing an output signal from one of the comparators which receives the code from a shift register, for controlling the flip-flop to control the multiplexing means to pass signals from the said one of the receivers.

* * * * *